United States Patent
Tyagi et al.

(10) Patent No.: US 11,605,245 B2
(45) Date of Patent: Mar. 14, 2023

(54) SYSTEMS AND METHODS FOR MASKING BIOMETRIC INFORMATION IN IMAGES

(71) Applicant: QUALCOMM Incorporated, San Diego, CA (US)

(72) Inventors: Arjun Tyagi, Roorkee (IN); Shubham Srivastava, Bangalore (IN); Mayank Kumar Mittal, Bangalore (IN); Phanish Hanagal Srinivasa Rao, Bangalore (IN); Manu Ramakrishna Iyengar, Bengaluru (IN); Venu Madhav Raidu, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 17/247,780

(22) Filed: Dec. 22, 2020

(65) Prior Publication Data
US 2022/0198208 A1    Jun. 23, 2022

(51) Int. Cl.
*G06V 40/50* (2022.01)
*G06V 10/25* (2022.01)
*G06V 40/12* (2022.01)
*G06V 40/13* (2022.01)
(Continued)

(52) U.S. Cl.
CPC ......... *G06V 40/50* (2022.01); *G06K 9/6215* (2013.01); *G06T 5/004* (2013.01); *G06T 5/006* (2013.01); *G06V 10/25* (2022.01); *G06V 40/13* (2022.01); *G06V 40/1365* (2022.01); *G06V 40/53* (2022.01)

(58) Field of Classification Search
CPC .... G06V 40/50; G06V 40/13; G06V 40/1365; G06V 40/53; G06V 40/40; G06V 10/25; G06K 9/6215; G06T 5/004; G06T 5/006
See application file for complete search history.

(56) References Cited

U.S. PATENT DOCUMENTS

2018/0295280 A1*  10/2018  Takayama ............ H04N 5/2621
2019/0034745 A1*   1/2019  Kuma .................... G06V 40/70
2019/0188507 A1*   6/2019  Kapinos ............. G06V 40/1347
(Continued)

OTHER PUBLICATIONS

Ribaric S., et al., "De-Identification for Privacy Protection in Multimedia Content: A survey", Signal Processing. Image Communication, Elsevier Science Publishers, Amsterdam, NL, vol. 47, Jun. 2016 (Jun. 2016), pp. 131-151, XP029753254, ISSN: 0923-5965, DOI: 10.1016/J.IMAGE.2016.05.020, from p. 10, the right-hand column the second paragraph, starting "5.4 Fingerprint de-identification", to p. 11, the left-hand column: "a synthetic real-look fingerprint image", "blurring by attenuating the high-frequency content".

(Continued)

*Primary Examiner* — Edward F Urban
*Assistant Examiner* — Wassim Mahrouka
(74) *Attorney, Agent, or Firm* — Qualcomm Incorporated (57) ABSTRACT

A method of securing biometric information may involve obtaining a digital image that contains biometric information. The method may involve identifying at least one region of the digital image that contains the biometric information and masking the biometric information. The biometric information may be a user's fingerprint and the user's fingerprint may be sufficiently masked that the masked fingerprint would not be accepted as authentic by most or all biometric authentication systems as matching the original fingerprint.

43 Claims, 8 Drawing Sheets

(51) Int. Cl.
*G06K 9/62* (2022.01)
*G06T 5/00* (2006.01)

(56) References Cited

U.S. PATENT DOCUMENTS

2020/0257791 A1* 8/2020 Shannon .................. G06F 21/44
2021/0034724 A1* 2/2021 Fong ...................... G06V 40/25
2022/0201253 A1* 6/2022 Lundberg ............... H04N 7/181

OTHER PUBLICATIONS

Lugini L., et al., "Removing Gender Signature from Fingerprints", 2014 37Th International Convention on Information and Communication Technology, Electronics and Microelectronics (MIPRO), MIPRO, May 26, 2014 (May 26, 2014), pp. 1283-1287, XP032622846, DOI: 10.1109/MIPRO.2014.6859765, [retrieved on Jul. 17, 2014] abstract p. 2.

Malhotra A., et al., "On Privacy Preserving Anonymization of Finger-selfies", 2020 IEEE/CVF Conference on Computer Vision and Pattern Recognition Workshops (CVPRW), IEEE, Jun. 14, 2020 (Jun. 14, 2020), pp. 120-128, XP033799229, DOI: 10.1109/CVPRW50498.2020.00021 [retrieved on Jul. 27, 2020] abstract 2. Privacy Preserving Anonymization, p. 2, right-hand column—p. 4, figures 2-4.

International Search Report and Written Opinion—PCT/US2021/072859—ISA/EPO—dated Apr. 7, 2022.

* cited by examiner

SYSTEMS AND METHODS FOR MASKING BIOMETRIC INFORMATION IN IMAGES

TECHNICAL FIELD

This disclosure relates generally to masking biometric information in images.

DESCRIPTION OF THE RELATED TECHNOLOGY

As image analysis capabilities and the resolution and quality of cameras have improved over time, new vulnerabilities in biometric information have arisen. As an example, researchers have successfully extracted usable fingerprints from photos of fingers taken at a distance of around 10 feet. Techniques for protecting biometric information from such threats would be desirable.

SUMMARY

The systems, methods and devices of the disclosure each have several innovative aspects, no single one of which is solely responsible for the desirable attributes disclosed herein.

One innovative aspect of the subject matter described in this disclosure can be implemented in a method of securing biometric information. The method may involve obtaining a digital image that contains biometric information, identifying at least one region of the digital image that contains the biometric information, and masking the biometric information in the at least one region of the digital image.

In some implementations, the biometric information is a fingerprint. According to some examples, masking the biometric information includes generating downscaled image information corresponding to the at least one region of the digital image at an original resolution and subsequently upscaling the downscaled image information to the original resolution. In some instances, the biometric information is a human fingerprint and masking the biometric information includes obtaining a synthetic fingerprint and inserting the synthetic fingerprint in the digital image in place of the human fingerprint. In some instances, the biometric information is a fingerprint and masking the biometric information includes extracting locations of a plurality of keypoints within the fingerprint. In some instances, masking the biometric information includes generating transformed image information associated with the at least one region that contains the biometric information in a frequency domain and attenuating at least one component of the transformed image information in the frequency domain. In some instances, masking the biometric information includes transforming image information associated with the at least one region that contains the biometric information in a frequency domain and attenuating components of the transformed image information that have a frequency above a threshold frequency. In some instances, masking the biometric information includes applying a geometric distortion to the at least one region that contains the biometric information. In some instances, masking the biometric information includes applying a blurring filter and/or a sharpening filter to the at least one region that contains the biometric information. In some instances, masking the biometric information includes applying a decimation filter to the at least one region that contains the biometric information and subsequently interpolating image information removed by the decimation filter. In some instances, the method also includes blending one or more transitions between the masked biometric information and portions of the digital image that partly or wholly surround the masked biometric information. In some instances, masking the biometric information in the at least one region of the digital image includes applying a masking operation to the biometric information to create masked biometric information, determining that the biometric information and the masked biometric information have a biometric similarity score that is less than a threshold, and inserting the masked biometric in the at least one region of the digital image. In some instances, the method is performed by a mobile device. In some instances, masking the biometric information in the at least one region of the digital image includes applying a first masking operation to the biometric information to create first masked biometric information, determining that the biometric information and the first masked biometric information have a first biometric similarity score, the first biometric similarity score being equal to or exceeding a threshold, applying a second masking operation to the biometric information or to the first masked biometric information to create second masked biometric information, determining that the biometric information and the second masked biometric information have a second biometric similarity score, the second biometric similarity score being less than the threshold, and inserting the second masked biometric into the at least one region of the digital image. In some instances, applying the second masking operation to create second masked biometric information includes applying the second masking operation to the biometric information and the second masking operation alters the biometric information more than the first masking operation.

Another innovative aspect of the subject matter described in this disclosure can be implemented in an apparatus. The apparatus may include a control system configured to obtain a digital image that contains biometric information, identify at least one region of the digital image that contains the biometric information, and mask the biometric information in the at least one region of the digital image.

In some implementations, the apparatus includes one or more servers in a social media service and the control system is configured to obtain the digital image from a user of the social media service. According to some examples, the apparatus further includes a camera and the control system is further configured to obtain the digital image using the camera. In some instances, the apparatus is a mobile device. In some instances, the biometric information is a fingerprint and the control system is configured to mask the fingerprint in the at least one region of the digital image. In some instances, the control system is configured to mask the biometric information by generating downscaled image information corresponding to the at least one region of the digital image at an original resolution and subsequently upscaling the downscaled image information to the original resolution. In some instances, the biometric information is a human fingerprint and the control system is configured to mask the biometric information by obtaining a synthetic fingerprint and inserting the synthetic fingerprint in the digital image in place of the human fingerprint. In some instances, the biometric information is a fingerprint and the control system is configured to mask the biometric information by extracting locations of a plurality of keypoints within the fingerprint. In some instances, the control system is configured to mask the biometric information by generating transformed image information associated with the at least one region that contains the biometric information in a frequency domain and attenuating at least one component of the transformed image information in the frequency domain. In some instances, the control system is configured to mask the biometric information by transforming image information associated with the at least one region that contains the biometric information in a frequency domain and attenuating components of the transformed image information that have a frequency above a threshold frequency. In some instances, the control system is configured to mask the biometric information by applying a geometric distortion to the at least one region that contains the biometric information. In some instances, the control system is configured to mask the biometric information by applying a blurring filter and/or a sharpening filter to the at least one region that contains the biometric information. In some instances, the control system is configured to mask the biometric information by applying a decimation filter to the at least one region that contains the biometric information and subsequently interpolating image information removed by the decimation filter. In some instances, the control system is configured to blend one or more transitions between the masked biometric information and portions of the digital image that partly or wholly surround the masked biometric information. In some instances, the control system is configured to mask the biometric information by applying a masking operation to the biometric information to create masked biometric information, determining that the biometric information and the masked biometric information have a biometric similarity score that is less than a threshold, and inserting the masked biometric in the at least one region of the digital image. In some instances, the control system is configured to mask the biometric information by applying a first masking operation to the biometric information to create first masked biometric information, determining that the biometric information and the first masked biometric information have a first biometric similarity score, the first biometric similarity score being equal to or exceeding a threshold, applying a second masking operation to the biometric information or to the first masked biometric information to create second masked biometric information, determining that the biometric information and the second masked biometric information have a second biometric similarity score, the second biometric similarity score being less than the threshold, and inserting the second masked biometric into the at least one region of the digital image. In some instances, the control system is configured to apply the second masking operation to create second masked biometric information by applying the second masking operation to the biometric information and the control system is configured to alter the biometric information more when applying the second masking operation than when applying the first masking operation.

Another innovative aspect of the subject matter described in this disclosure can be implemented in an apparatus. The apparatus may include means for obtaining a digital image that contains biometric information, means for identifying at least one region of the digital image that contains the biometric information, and means for masking the biometric information in the at least one region of the digital image.

In some implementations, the apparatus is a mobile device and the means for obtaining the digital image that contains biometric information includes a camera in the mobile device. According to some examples, the means for masking are configured to mask the biometric information by generating downscaled image information corresponding to the at least one region of the digital image at an original resolution and subsequently upscaling the downscaled image information to the original resolution. In some instances, the biometric information is a human fingerprint and the means for masking are configured to mask the biometric information by obtaining a synthetic fingerprint and inserting the synthetic fingerprint in the digital image in place of the human fingerprint. In some instances, the biometric information is a fingerprint and the means for masking are configured to mask the biometric information by extracting locations of a plurality of keypoints within the fingerprint. In some instances, the means for masking are configured to mask the biometric information by generating transformed image information associated with the at least one region that contains the biometric information in a frequency domain and attenuating at least one component of the transformed image information in the frequency domain. In some instances, the means for masking are configured to mask the biometric information by transforming image information associated with the at least one region that contains the biometric information in a frequency domain and attenuating components of the transformed image information that have a frequency above a threshold frequency. In some instances, the means for masking are configured to mask the biometric information by applying a geometric distortion to the at least one region that contains the biometric information. In some instances, the means for masking are configured to mask the biometric information by applying a blurring filter and/or a sharpening filter to the at least one region that contains the biometric information. In some instances, the means for masking are configured to mask the biometric information by applying a decimation filter to the at least one region that contains the biometric information and subsequently interpolating image information removed by the decimation filter. In some instances, the apparatus further includes means for blending one or more transitions between the masked biometric information and portions of the digital image that partly or wholly surround the masked biometric information. In some instances, the means for masking are configured to mask the biometric information by applying a masking operation to the biometric information to create masked biometric information, determining that the biometric information and the masked biometric information have a biometric similarity score that is less than a threshold, and inserting the masked biometric in the at least one region of the digital image. In some instances, the means for masking are configured to mask the biometric information by applying a first masking operation to the biometric information to create first masked biometric information, determining that the biometric information and the first masked biometric information have a first biometric similarity score, the first biometric similarity score being equal to or exceeding a threshold, applying a second masking operation to the biometric information or to the first masked biometric information to create second masked biometric information, determining that the biometric information and the second masked biometric information have a second biometric similarity score, the second biometric similarity score being less than the threshold, and inserting the second masked biometric into the at least one region of the digital image. In some instances, the means for masking are configured to (a) apply the second masking operation to create second masked biometric information by applying the second masking operation to the biometric information and (b) alter the biometric information more when applying the second masking operation than when applying the first masking operation.

Some or all of the methods described herein may be performed by one or more devices according to instructions (e.g., software) stored on one or more non-transitory media.

Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. As examples, it is contemplated that the described implementations may be included in or associated with a variety of computing systems such as, but not limited to: social media networks, file sharing networks, image sharing networks, video sharing networks, image storage systems, video storage systems, and news platforms. Computing systems which may include or be associated with the described implementations can include local computing systems as well as remote computing systems, which may also be referred to as a cloud computing system. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automatic teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, automobile doors, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

As previously mentioned, new vulnerabilities in biometric information have arisen as a result of improvements in image analysis capabilities and improvements in camera technologies. As an example, an image such as image 100 of FIG. 1 may depict the underside of a person's finger. In the past, imagery that isn't specifically configured to capture biometric details, such as image 100, was not seen as presenting a risk of exposure of sensitive biometric information. However, with advancements in image analysis capabilities and as the resolution and quality of imagery is improvement, sensitive biometric information can be extracted from even seemingly innocuous imagery such as image 100. In particular, it is now often possible to extract a usable fingerprint from such images, as shown by the extraction of fingerprint 104 from region 102 of image 100 in FIG. 1. Thus, it would desirable to mask biometric information in imagery, to hinder or block the nefarious extraction of sensitive biometric information from imagery.

Figure 1:
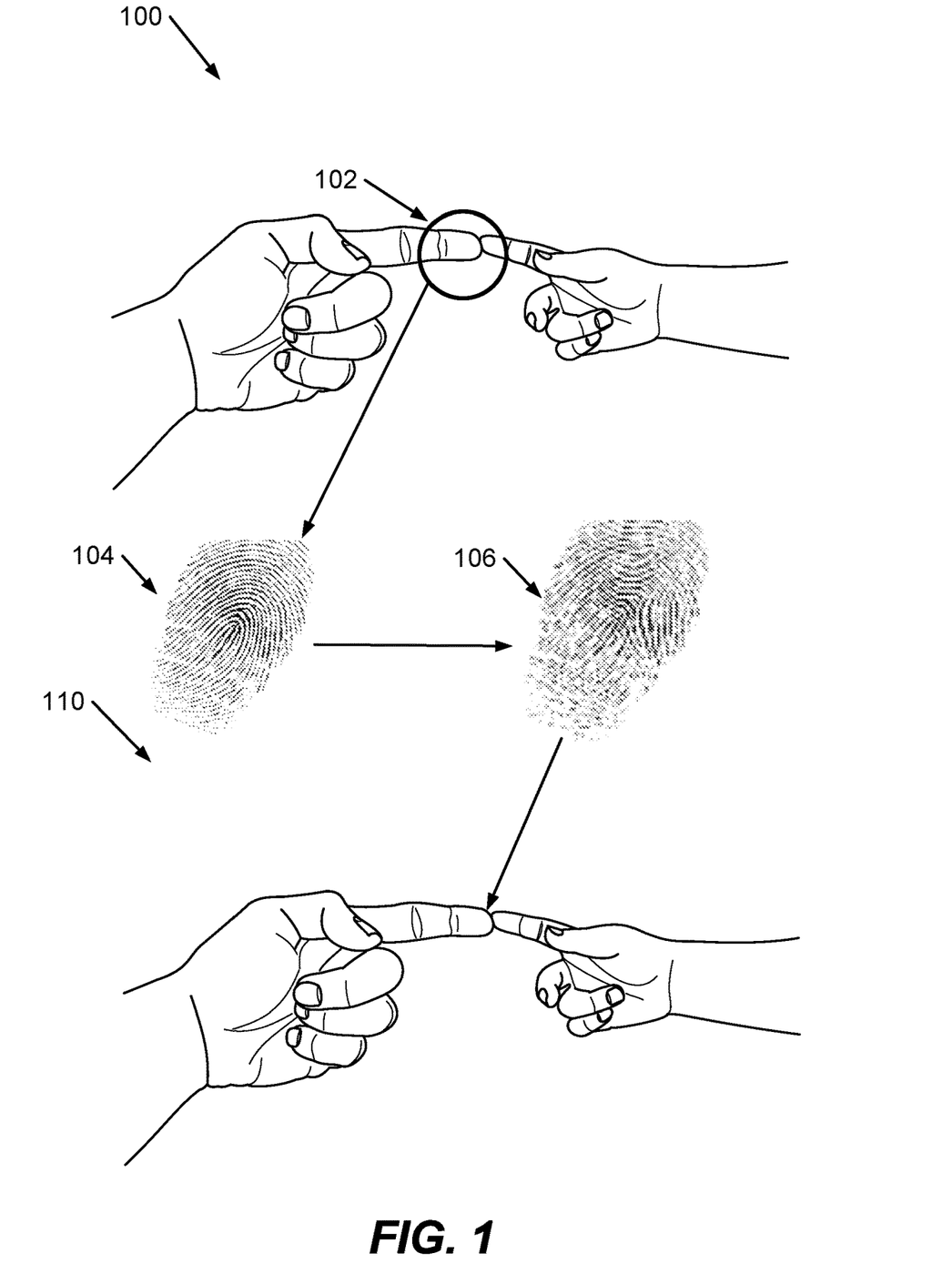
FIG. 1 depicts the masking of biometric information in an image according to various disclosed implementations.

As shown in FIG. 1, imagery containing potentially exposed biometric information can be analyzed to detect such biometric information and can then be modified to mask the biometric information, in accordance with various implementations disclosed herein. In the example of FIG. 1, an original image 100 is obtained and analyzed for the presence of potentially vulnerable biometric information. Upon detection of potentially vulnerable biometric information (e.g., in region 102), the biometric information 104 may be extracted from image 100 and then modified into false biometric information 106. The false biometric information 106 may be sufficiently distinct from the original biometric information 104 that extraction of the false biometric information 106 would not be sufficient to spoof the original biometric information 104. The false biometric information 106 is then inserted into the image, replacing the original biometric information 104, to create a biometrically-masked image 110.

Figure 2:
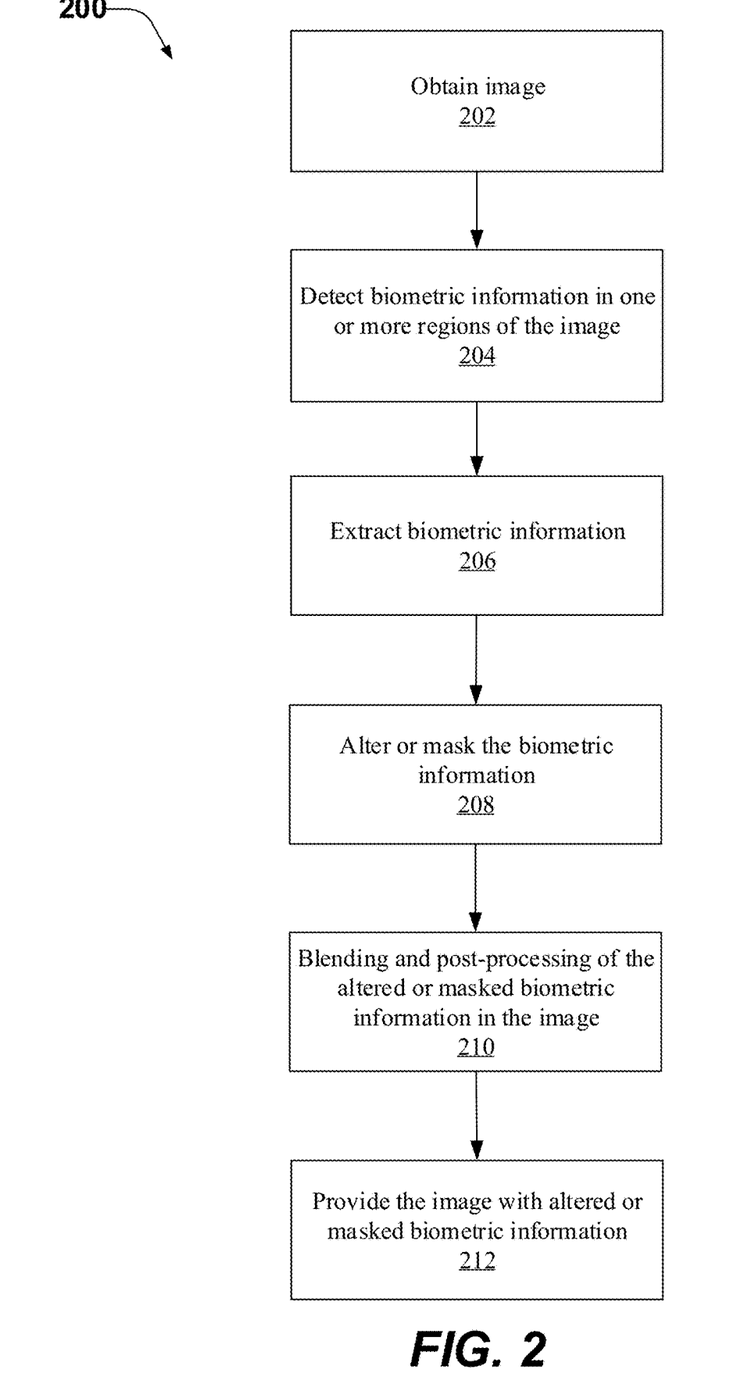
FIGS. 2 and 3 are flow diagrams that provides example blocks of methods according to various disclosed implementations.

Referring now to FIG. 2, a method 200 for masking biometric information in images includes, at block 202, obtaining an image potentially containing biometric information. Block 202 may be associated with the initial capture of an image or images, such as while taking a picture or capturing a video with a camera, when method 200 is performed at the time of image capture. As an example, method 200 may be started and block 202 performed upon the capture of an image or video with a camera. Method 200 may be initiated and block 202 may be performed subsequent to an initial capture of imagery, in some other implementations. As an example, method 200 may be initiated and block 202 performed when a user device receives a request to share or transmit imagery, when a user device transmits an image (e.g., to another device, to a social media or networking system, etc.), when a system such as a social network system receives a new image, when a system begins hosting a shared image, upon receipt by a device of a user's request, or upon some other triggering condition. In general, method 200 may be started and block 202 performed at any desired time.

After obtaining an image potentially containing biometric information in block 202, method 200 may progress to block 204. Block 204 may include analyzing the image obtained in block 202 for the presence of biometric information. In some implementations, block 204 may involve identifying one or more regions of the image that may contain biometric information. In the context of the FIG. 1 example, block 204 may involve analyzing image 100 and detecting that region 102 may contain biometric information.

In blocks 206 and 208, method 200 may involve extracting biometric information from the image obtained in block 202 and then altering and/or masking the biometric information. In the context of fingerprints, block 206 may involve, as an example, extracting information about the ridges and valleys of the fingerprints (e.g., extracting a map of the ridges and valleys). Altering or masking the biometric information in block 208 may involve one or more techniques including, but not limited to: lossy scaling (i.e., generating a downscaled image of the fingerprint, then upscaling the downscaled image of the fingerprint, one or more times), a filter or algorithm that changes relative positions of biometric keypoints via geometric distortions (e.g., a radial distortion and a pincushion distortion, etc.), applying a blurring filter and/or sharpening filter, synthesis of a new fingerprint to replace the original fingerprint (via use of a generative adversarial network or other technique to create synthetic fingerprints), applying a deblocking filter (e.g., a filter that smooths sharp edges), a smoothing filter, decimation and interpolation of a fingerprint region, applying a frequency transformation (e.g., generating transformed image information associated with the original fingerprint, the image information being transformed into a frequency domain, and attenuating or otherwise modifying at least one frequency component (e.g., attenuating components with a frequency above a threshold frequency, which may be a predetermined frequency, thereby hiding key biometric details), and overlaying a mask over the biometric information (e.g., covering the biometric information with one or more visually opaque objects). These techniques may be performed individually or in any suitable combination. In the context of the FIG. 1 example, block 206 may involve obtaining a map of the ridges and valleys of biometric information 104 and block 208 may involve transforming the original biometric information 104 into masked biometric information 106 (or involve synthetically creating biometric information 106).

In some implementations, the altering or masking of block 206 is specific to the keypoints present in the biometric information. As an example, the altering or masking of block 206 can be derived from keypoints extracted from the biometric information, to ensure that the transformation(s) applied to each unique set of biometric information is unique. Such an arrangement may make it difficult or impossible to recover the original keypoints, since the transformations applied in block 206 are specific to the original keypoints, rather than being generically applied to all sets of biometric information. In some other implementations, the altering or masking of block 206 is not specific to the keypoints present in the biometric information. As examples, smoothening filters, decimation and interpolation, and other such techniques may be generically applied to more than one set of biometric information. These types of transformations may, in some instances, utilize the lossy nature of the transformations to make it difficult or impossible to recover the original (unmasked) biometric information.

In some implementations, the original image is perceptibly altered or degraded by the altering or masking of biometric information in block 206. As examples, overlaying an opaque mask over the biometric information, geometrically distorting biometric information, and lossy scaling beyond a certain threshold may alter or degrade the appearance of the original image. In some other implementations, the original image is not perceptibly altered by the altering or masking of the biometric information. As examples, replacing the biometric information with synthesized biometric information, lossy scaling less than a certain threshold, and other transformations may not perceptibly alter the original image (i.e., a casual observer would be unable, or find it quite difficult, to perceive a change between the original image and the image with masked biometric information).

In some implementations, the altering or masking of block 206 involves the use of feedback to determine how much alteration or masking is needed to protect the biometric information. In such implementations, block 206 may involve one or more rounds of alteration or masking of the original imagery containing biometric information, with measurements of fingerprint similarity between rounds to determine if a sufficient amount of alteration or masking has been applied. As an example, block 206 may involve (a) altering or masking the original imagery to a first extent in a first round (e.g., applying one round of lossy scaling), (b) obtaining a fingerprint similarity score between the original imagery and the altered or masked imagery from the first round, and (c), when the similarity score is above a threshold, which may be a predetermined threshold, (indicating that the altering or masking wasn't sufficient), further altering or masking the original imagery to a second extent in a second round. In the second round (and subsequent rounds, if needed), another round of altering or masking (e.g., another round of lossy scaling) may be applied to the altered or masked imagery from the first round. Additionally or alternatively, the second (and sequent rounds, if needed) may involve applying a more aggressive form of the altering or masking applied in the previous round. An altering or masking operation may be made more aggressive either by tuning parameters of the operation (e.g., reducing the resolution to which the original imagery is downscaled, in the example of lossy scaling operations), by applying an operation repeatedly (e.g., applying a lossy scaling operation multiple times), or by a combination of such techniques. In these implementations, any desired fingerprint similarity scoring technique may be used to determine if a sufficient amount of masking or altering has been applied. As just one example, a SourceAFIS similarity score may be used to determine if a sufficient amount of masking or altering has been applied.

Following the masking or altering of the biometric information in block 208, method 200 may proceed to optional block 210. In block 210, blending and other post-processing may be performed on the altered or masked biometric information. Block 210 may be performed to reduce or eliminate any visual artifacts introduced by the altering and/or masking operations of block 208. As an example, block 210 may involve smoothing transitions between the region containing biometric information (altered in block 208) and surrounding regions of the image.

In block 212, the image with altered or masked biometric information is provided. Block 212 may vary according to how method 200 is triggered. As an example, in implementations in which method 200 is triggered upon capturing an image by a camera, block 212 may involve saving a copy of the image with altered or masked biometric information (and optionally also saving the original unmasked image). As another example, in implementations in which method 200 is triggered upon a social networking system receiving an image for distribution, block 212 may involve distributing the image with altered or masked biometric information.

Figure 3:
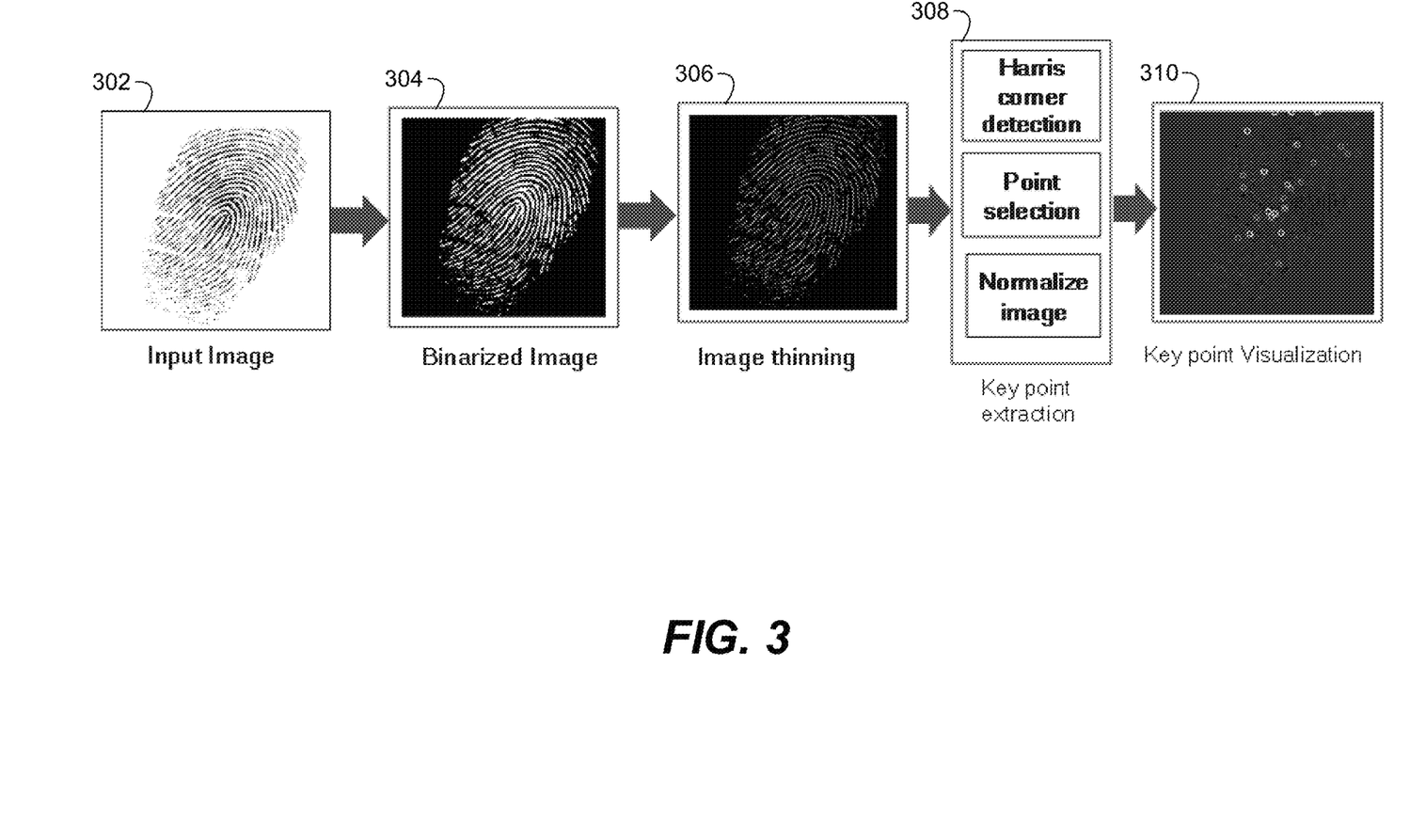

FIG. 3 shows a flow diagram that illustrates the extraction of keypoints from a biometric image. The flow diagram of FIG. 3 may thus be an example implementation of block 206 of method 200. As shown in FIG. 3, extracting biometric information from an image may involve obtaining the image at block 302, binarizing the image in block 304, thinning the binarized image in 306, extracting keypoints in block 308, and, optionally, visualizing the extracted keypoints in block 310. Obtaining the image at block 302 may involve analyzing regions of an input image to identify one or more regions that potentially contain biometric information. In the context of the FIG. 1 example, block 302 involves identifying region 102 of image 100 and obtaining the image data for region 102. Binarizing the image at block 304 may involve removing color and grayscales (e.g., to improve contrast and simplify subsequent processing). Thinning the image at block 306 may involve removing extraneous information (e.g., to simplify subsequent processing). Extracting biometric keypoints in block 308 may involve, as examples, a normalization of the image, a detection of points, and a detection of corners (e.g., via a Harris corner detector operator or via another suitable technique). If desired, other techniques for extracting fingerprint keypoints may be utilized.

Figure 4A:
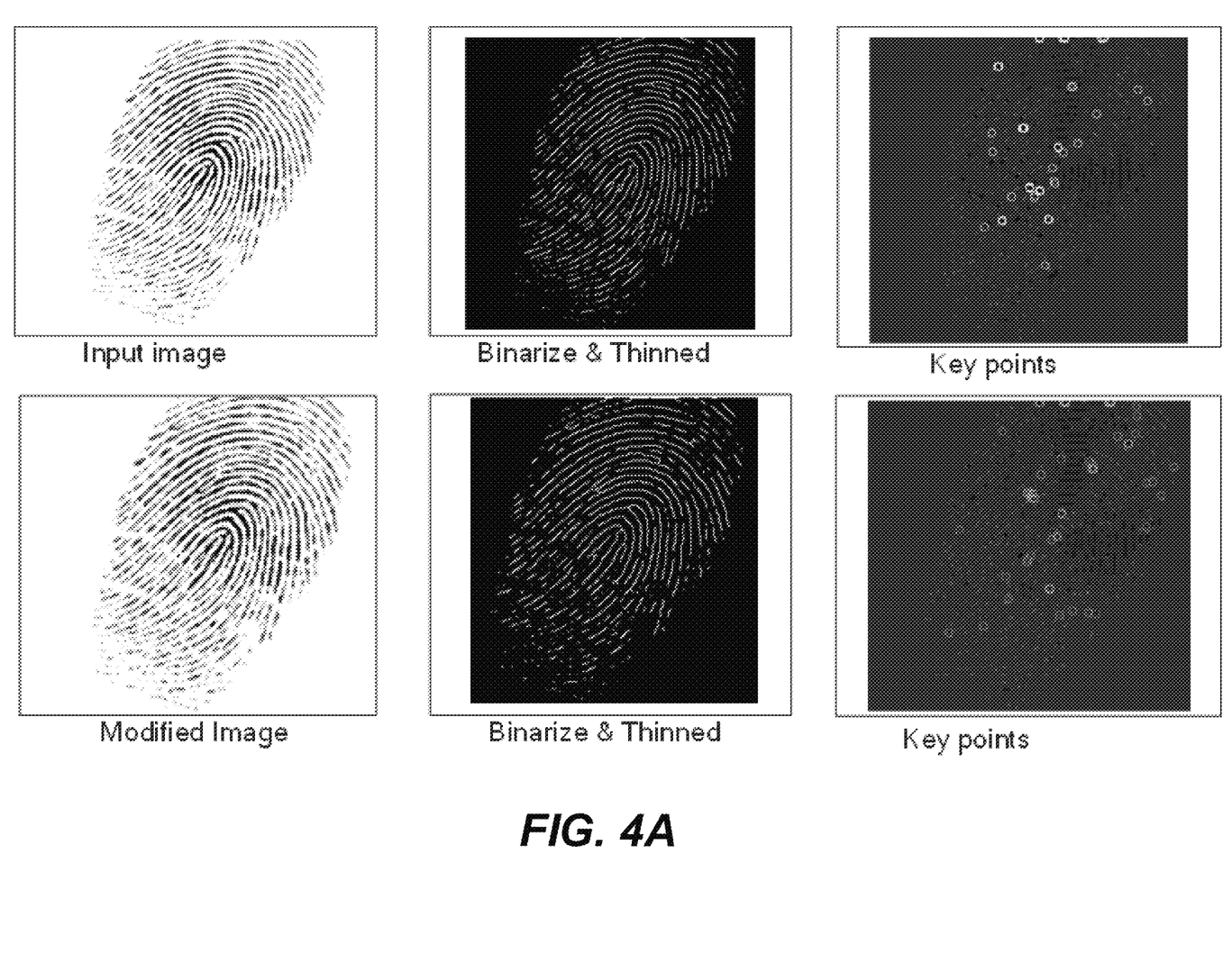
FIGS. 4A, 4B, and 4C show examples of masking biometric information in images according to various disclosed implementations.
Figure 4B:
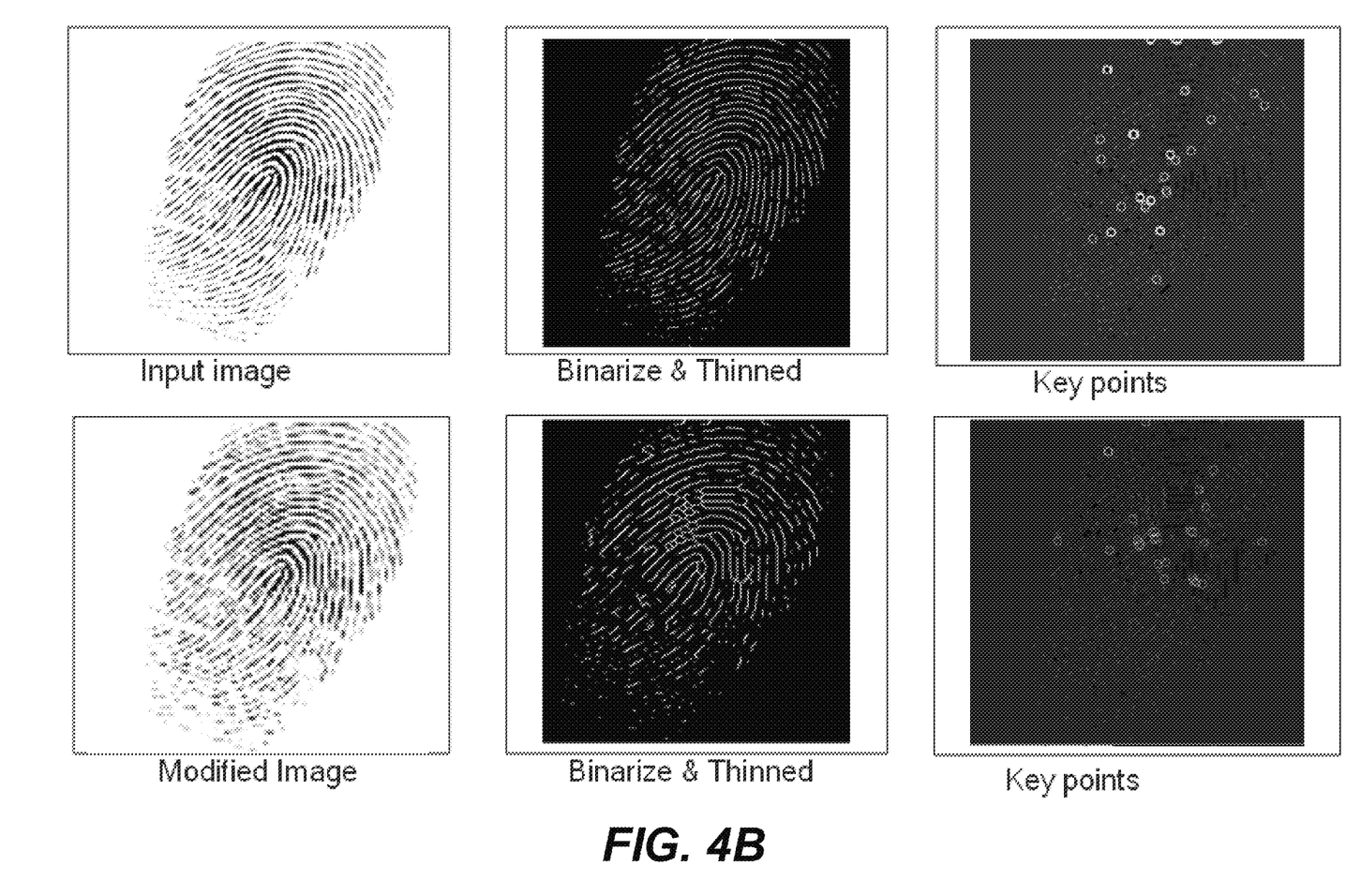
Figure 4C:
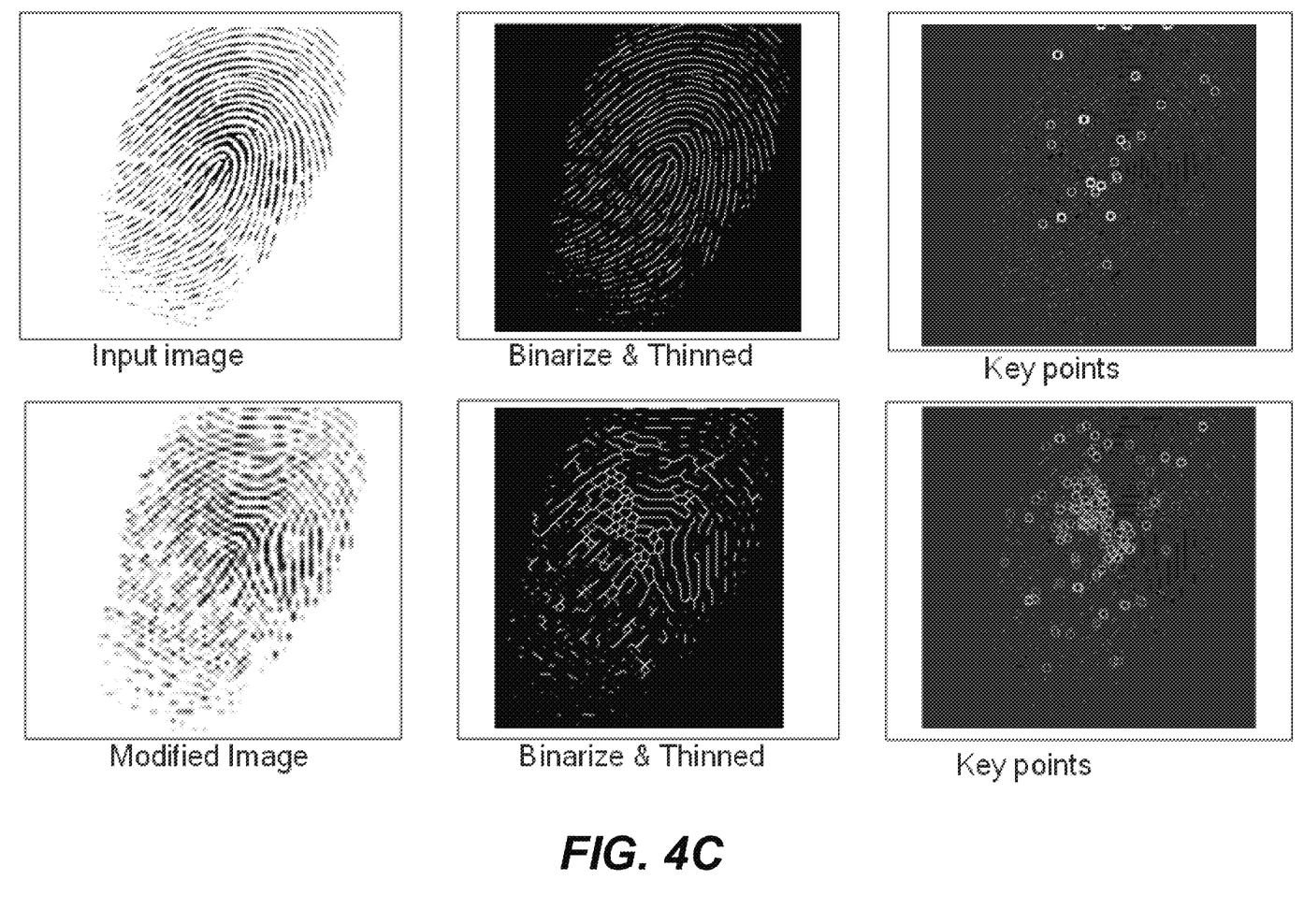

Examples of different levels of altering or masking biometric information are shown in FIGS. 4A, 4B, and 4C. In these examples, an original fingerprint was masked using lossy scaling (i.e., downscaling, then upscaling, the fingerprint one or more times). A relatively small amount of lossy scaling was applied in the FIG. 4A example (e.g., the fingerprint was downscaled, but to a relatively high resolution), a relatively large amount of lossy scaling was applied in the FIG. 4C example (e.g., the fingerprint was downscaled to a relatively low resolution and/or subjected to multiple iterations of lossy scaling), and an intermediate amount of lossy scaling was applied in the FIG. 4B example. Each of FIGS. 4A, 4B, and 4C illustrates the original input image and the final modified image; binarized and thinned versions of the original input image and the final modified image; and keypoints for the original input image and the final modified image.

After modification, the original and modified fingerprints of the examples of FIGS. 4A, 4B, and 4C were fed into SourceAFIS, which is an open source algorithm that can take two fingerprint images as input and then output a similarity score. A high similarity score from SourceAFIS between a subject fingerprint and an authenticated fingerprint indicates a greater likelihood that the subject fingerprint would be found, by a biometric authentication system, to match the authenticated fingerprint.

In the example of FIG. 4A, the modified fingerprint and the original fingerprint had a SourceAFIS similarity score of approximately 52. Despite the more aggressive modification applied in FIG. 4B (and the resulting degradation in visual quality), the original fingerprint and modified fingerprint from the example of FIG. 4B also had a SourceAFIS similarity score of approximately 52. In the example of FIG. 4C, which had the most aggressive modification of the biometric information, the modified fingerprint and the original fingerprint had a SourceAFIS similarity score of 0.

Figure 5:
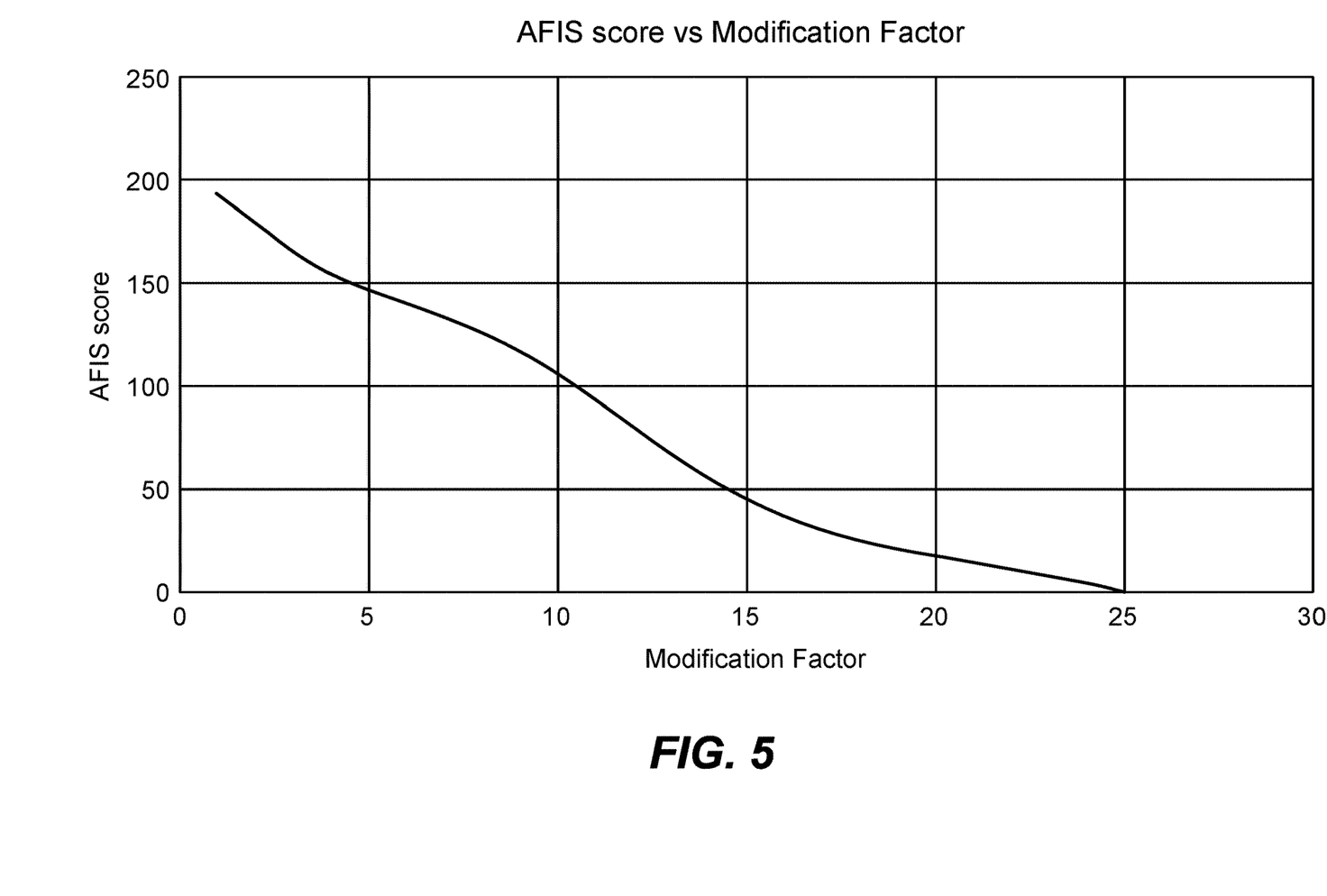
FIG. 5 is a graph of fingerprint similarity as a function of modification factor according to various disclosed implementations.

A plot of SourceAFIS similarity scores as a function of modification factor is shown in FIG. 5. The modification factor in FIG. 5 refers to the factor by which the spatial resolution of the fingerprint images were reduced (e.g., a modification factor of 25 indicates that the spatial information was reduced by a factor of 5 in a width dimension and by a factor of 5 in a height dimension). A higher modification factor is associated with a more aggressive lossy scaling operation. A lossy scaling operation may include a lossy down-sampling by a given factor followed by up-sampling using interpolation with the same factor such that the final image has the same size (e.g., number of pixels) as that of the original image. As shown in FIG. 5, the similarity score drops in a somewhat linear fashion until it hits a value of 0 at a modification factor of approximately 25. The relationship between AFIS score and the amount of modification will, of course, depend on what techniques are used to alter or mask the biometric information. The somewhat linear relationship of FIG. 5 is specific to a lossy scaling operation and may not apply to other operations for altering or masking biometric operations. It is noted that individual biometric authentication systems can be configured with different levels of similarity thresholds when comparing subject fingerprints to one or more authenticated fingerprints. As a result, it may be desirable to sufficiently mask or alter biometric information such that the resulting fingerprint would not be accepted as authentic by most or all biometric authentication systems as matching the original biometric information. If desired, a system designer may select an amount of modification to apply to biometric information based on information such as that presented in FIG. 5, such that the resulting masking strikes the desired balance between maintaining the quality of the original image (e.g., avoiding excessive distortions and other image artifacts) and securing the biometric information (e.g., ensuring the modified biometric information is sufficient distinct to not be accepted as authentic).

Figure 6:
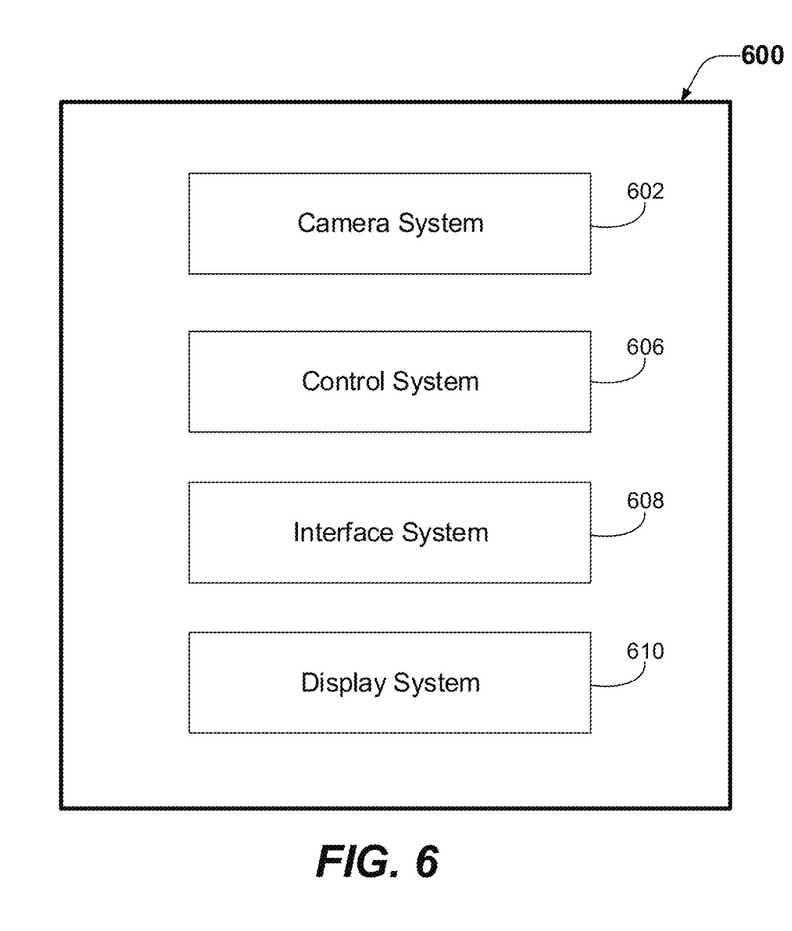
FIG. 6 is a block diagram that shows example components of an apparatus according to some disclosed implementations.

FIG. 6 is a block diagram that shows example components of an apparatus according to some disclosed implementations. Some implementations of the apparatus 600 may include the camera system 602, the control system 606, the interface system 608, and/or the display system 610.

The control system 606 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 606 also may include (and/or be configured for communication with) one or more memory devices, such as one or more random access memory (RAM) devices, read-only memory (ROM) devices, etc. Accordingly, the apparatus 600 may have a memory system that includes one or more memory devices, though the memory system is not shown in FIG. 6. The control system 606 may be configured for receiving and processing data from the camera system 602 or from the interface system 608. As a first example, the apparatus 600 may be a device with a camera system 602 and may be configured to mask or alter biometric information (e.g., according to a technique such as that described in connection with FIG. 2) as part of capturing images, as part of saving images, as part of editing images, as part of sharing or uploading images to a third party, etc. As a second example, the apparatus 600 may be part of a social networking server or service (which may lack a camera system 602) that is configured to mask or alter biometric information as part of receiving images for sharing, as part of editing images, as part of sharing images to other parties, etc. In some implementations, functionality of the control system 606 may be partitioned between one or more controllers or processors, such as a dedicated camera controller and an applications processor of a mobile device or such as different processors in a social networking service or cloud computing system.

Some implementations of the apparatus 600 may include the interface system 608. In some examples, the interface system 608 may include a wireless interface system. In some implementations, the interface system 608 may include a user interface system, one or more network interfaces, one or more interfaces between the control system 606 and a memory system and/or one or more interfaces between the control system 606 and one or more external device interfaces (e.g., ports or applications processors).

According to some examples, the apparatus 600 may include a display system 610 that includes one or more displays. For example, the display system 610 may include one or more LED displays, such as one or more organic LED (OLED) displays.

The apparatus 600 may be used in a variety of different contexts, many examples of which are disclosed herein. For example, in some implementations a mobile device may include the apparatus 600. In some implementations, a wearable device may include the apparatus 600. The wearable device may, for example, be a bracelet, an armband, a wristband, a ring, a headband, an earbud or a patch.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. A method of securing biometric information, the method comprising:
    obtaining a digital image that contains biometric information;
    identifying at least one region of the digital image that contains the biometric information;
    masking the biometric information in the at least one region of the digital image; and
    blending one or more transitions between masked biometric information and portions of the digital image that partly or wholly surround the masked biometric information.

2. The method of claim 1, wherein the biometric information comprises a fingerprint.

3. The method of claim 1, wherein masking the biometric information comprises generating downscaled image information corresponding to the at least one region of the digital image at an original resolution and subsequently upscaling the downscaled image information to the original resolution.

4. The method of claim 1, wherein the biometric information comprises a human fingerprint and wherein masking the biometric information comprises obtaining a synthetic fingerprint and inserting the synthetic fingerprint in the digital image in place of the human fingerprint.

5. The method of claim 1, wherein the biometric information comprises a fingerprint and wherein masking the biometric information comprises extracting locations of a plurality of keypoints within the fingerprint.

6. The method of claim 1, wherein masking the biometric information comprises generating transformed image information associated with the at least one region that contains the biometric information in a frequency domain and attenuating at least one component of the transformed image information in the frequency domain.

7. The method of claim 1, wherein masking the biometric information comprises transforming image information associated with the at least one region that contains the biometric information in a frequency domain and attenuating components of the transformed image information that have a frequency above a threshold frequency.

8. The method of claim 1, wherein masking the biometric information comprises applying a geometric distortion to the at least one region that contains the biometric information.

9. The method of claim 1, wherein masking the biometric information comprises applying a blurring filter and/or a sharpening filter to the at least one region that contains the biometric information.

10. The method of claim 1, wherein masking the biometric information comprises applying a decimation filter to the at least one region that contains the biometric information and subsequently interpolating image information removed by the decimation filter.

11. The method of claim 1, wherein masking the biometric information in the at least one region of the digital image comprises:
    applying a masking operation to the biometric information to create masked biometric information;
    determining that the biometric information and the masked biometric information have a biometric similarity score that is less than a threshold; and
    inserting the masked biometric in the at least one region of the digital image.

12. The method of claim 1, the method of claim 1 wherein the method is performed by a mobile device.

13. The method of claim 1, wherein masking the biometric information in the at least one region of the digital image comprises:
    applying a first masking operation to the biometric information to create first masked biometric information;
    determining that the biometric information and the first masked biometric information have a first biometric similarity score, the first biometric similarity score being equal to or exceeding a threshold;
    applying a second masking operation to the biometric information or to the first masked biometric information to create second masked biometric information;
    determining that the biometric information and the second masked biometric information have a second biometric similarity score, the second biometric similarity score being less than the threshold; and
    inserting the second masked biometric into the at least one region of the digital image.

14. The method of claim 13, wherein applying the second masking operation to create second masked biometric information comprises applying the second masking operation to the biometric information and wherein the second masking operation alters the biometric information more than the first masking operation.

15. An apparatus having a control system, the control system configured to:
    obtain a digital image that contains biometric information;
    identify at least one region of the digital image that contains the biometric information;
    mask the biometric information in the at least one region of the digital image; and blend one or more transitions between masked biometric information and portions of the digital image that partly or wholly surround the masked biometric information.

16. The apparatus of claim 15, wherein the apparatus comprises one or more servers in a social media service and wherein the control system is configured to obtain the digital image from a user of the social media service.

17. The apparatus of claim 15, further comprising a camera and wherein the control system is further configured to obtain the digital image using the camera.

18. The apparatus of claim 15, wherein the apparatus comprises a mobile device.

19. The apparatus of claim 15, wherein the biometric information comprises a fingerprint and wherein the control system is configured to mask the fingerprint in the at least one region of the digital image.

20. The apparatus of claim 15, wherein the control system is configured to mask the biometric information by generating downscaled image information corresponding to the at least one region of the digital image at an original resolution and subsequently upscaling the downscaled image information to the original resolution.

21. The apparatus of claim 15, wherein the biometric information comprises a human fingerprint and wherein the control system is configured to mask the biometric information by obtaining a synthetic fingerprint and inserting the synthetic fingerprint in the digital image in place of the human fingerprint.

22. The apparatus of claim 15, wherein the biometric information comprises a fingerprint and wherein the control system is configured to mask the biometric information by extracting locations of a plurality of keypoints within the fingerprint.

23. The apparatus of claim 15, wherein the control system is configured to mask the biometric information by generating transformed image information associated with the at least one region that contains the biometric information in a frequency domain and attenuating at least one component of the transformed image information in the frequency domain.

24. The apparatus of claim 15, wherein the control system is configured to mask the biometric information by transforming image information associated with the at least one region that contains the biometric information in a frequency domain and attenuating components of the transformed image information that have a frequency above a threshold frequency.

25. The apparatus of claim 15, wherein the control system is configured to mask the biometric information by applying a geometric distortion to the at least one region that contains the biometric information.

26. The apparatus of claim 15, wherein the control system is configured to mask the biometric information by applying a blurring filter and/or a sharpening filter to the at least one region that contains the biometric information.

27. The apparatus of claim 15, wherein the control system is configured to mask the biometric information by applying a decimation filter to the at least one region that contains the biometric information and subsequently interpolating image information removed by the decimation filter.

28. The apparatus of claim 15, wherein the control system is configured to mask the biometric information by:
applying a masking operation to the biometric information to create masked biometric information;
determining that the biometric information and the masked biometric information have a biometric similarity score that is less than a threshold; and
inserting the masked biometric in the at least one region of the digital image.

29. The apparatus of claim 15, wherein the control system is configured to mask the biometric information by:
applying a first masking operation to the biometric information to create first masked biometric information;
determining that the biometric information and the first masked biometric information have a first biometric similarity score, the first biometric similarity score being equal to or exceeding a threshold;
applying a second masking operation to the biometric information or to the first masked biometric information to create second masked biometric information;
determining that the biometric information and the second masked biometric information have a second biometric similarity score, the second biometric similarity score being less than the threshold; and
inserting the second masked biometric into the at least one region of the digital image.

30. The apparatus of claim 29, wherein the control system is configured to apply the second masking operation to create second masked biometric information by applying the second masking operation to the biometric information and wherein the control system is configured to alter the biometric information more when applying the second masking operation than when applying the first masking operation.

31. An apparatus, comprising:
means for obtaining a digital image that contains biometric information;
means for identifying at least one region of the digital image that contains the biometric information;
means for masking the biometric information in the at least one region of the digital image; and
means for blending one or more transitions between masked biometric information and portions of the digital image that partly or wholly surround the masked biometric information.

32. The apparatus of claim 31, wherein the apparatus comprises a mobile device and wherein the means for obtaining the digital image that contains biometric information comprises a camera in the mobile device.

33. The apparatus of claim 31, wherein the means for masking are configured to mask the biometric information by generating downscaled image information corresponding to the at least one region of the digital image at an original resolution and subsequently upscaling the downscaled image information to the original resolution.

34. The apparatus of claim 31, wherein the biometric information comprises a human fingerprint and wherein the means for masking are configured to mask the biometric information by obtaining a synthetic fingerprint and inserting the synthetic fingerprint in the digital image in place of the human fingerprint.

35. The apparatus of claim 31, wherein the biometric information comprises a fingerprint and wherein the means for masking are configured to mask the biometric information by extracting locations of a plurality of keypoints within the fingerprint.

36. The apparatus of claim 31, wherein the means for masking are configured to mask the biometric information by generating transformed image information associated with the at least one region that contains the biometric information in a frequency domain and attenuating at least one component of the transformed image information in the frequency domain.

37. The apparatus of claim 31, wherein the means for masking are configured to mask the biometric information by transforming image information associated with the at least one region that contains the biometric information in a frequency domain and attenuating components of the transformed image information that have a frequency above a threshold frequency.

38. The apparatus of claim 31, wherein the means for masking are configured to mask the biometric information by applying a geometric distortion to the at least one region that contains the biometric information.

39. The apparatus of claim 31, wherein the means for masking are configured to mask the biometric information by applying a blurring filter and/or a sharpening filter to the at least one region that contains the biometric information.

40. The apparatus of claim 31, wherein the means for masking are configured to mask the biometric information by applying a decimation filter to the at least one region that contains the biometric information and subsequently interpolating image information removed by the decimation filter.

41. The apparatus of claim 31, wherein the means for masking are configured to mask the biometric information by:
   applying a masking operation to the biometric information to create masked biometric information;
   determining that the biometric information and the masked biometric information have a biometric similarity score that is less than a threshold; and
   inserting the masked biometric in the at least one region of the digital image.

42. The apparatus of claim 31, wherein the means for masking are configured to mask the biometric information by:
   applying a first masking operation to the biometric information to create first masked biometric information;
   determining that the biometric information and the first masked biometric information have a first biometric similarity score, the first biometric similarity score being equal to or exceeding a threshold;
   applying a second masking operation to the biometric information or to the first masked biometric information to create second masked biometric information;
   determining that the biometric information and the second masked biometric information have a second biometric similarity score, the second biometric similarity score being less than the threshold; and
   inserting the second masked biometric into the at least one region of the digital image.

43. The apparatus of claim 42, wherein the means for masking are configured to (a) apply the second masking operation to create second masked biometric information by applying the second masking operation to the biometric information and (b) alter the biometric information more when applying the second masking operation than when applying the first masking operation.

* * * * *